Oct. 24, 1939.   E. D. GREEN   2,177,103
RIDGE CUTTING ASSEMBLY
Filed June 7, 1937
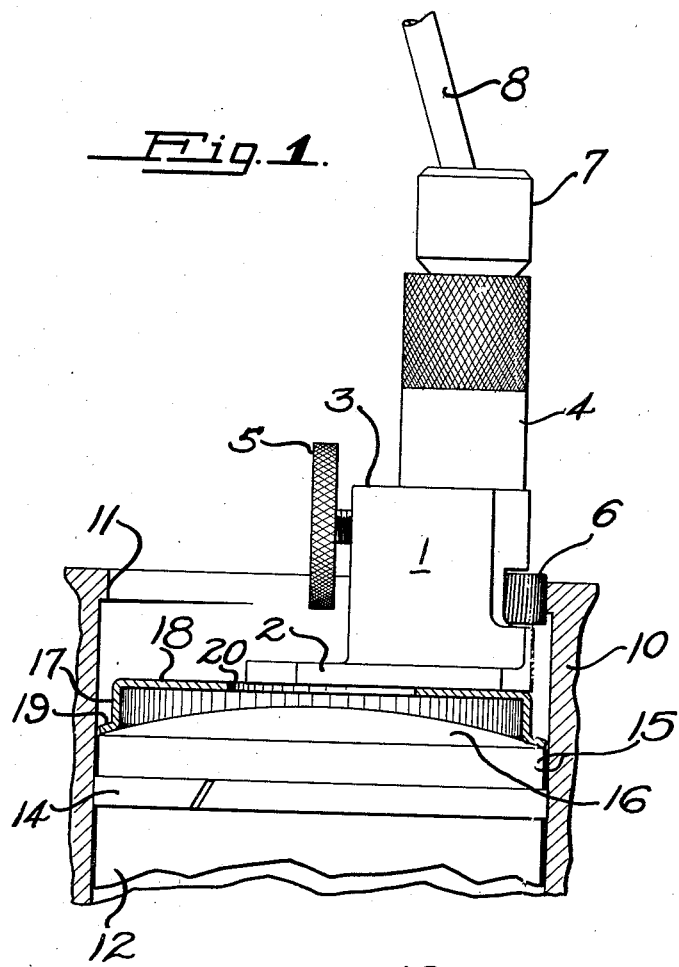
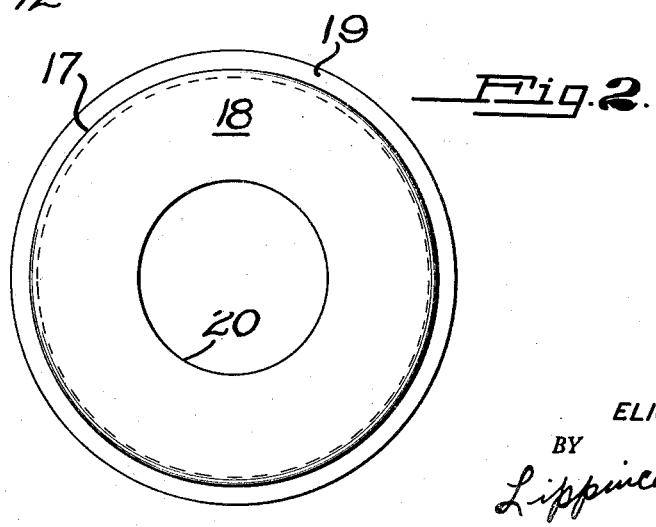
INVENTOR,
ELIOT D. GREEN.
BY Lippincott & Metcalf
ATTORNEYS.

Patented Oct. 24, 1939

2,177,103

UNITED STATES PATENT OFFICE 2,177,103

RIDGE CUTTING ASSEMBLY

Eliot D. Green, San Francisco, Calif.

Application June 7, 1937, Serial No. 146,785

3 Claims. (Cl. 90—12)

My invention relates to a ridge cutting assembly and more particularly to the combination of a ridge cutter supported on a piston within an engine cylinder, and an adapter so fashioned that when the piston has a curved upper surface the ridge cutter will be maintained in proper relation to the ridge on the cylinder.

After prolonged periods of use automotive and other internal combustion engine cylinders become worn, the wear being non-uniform, so that the cross section of the cylinder becomes slightly oval with the long axis perpendicular to the plane of the crank shaft. The greatest wear occurs on the side of the cylinder which receives the thrust due to the reaction of the crank shaft on the explosion stroke of the piston. The actual wearing surfaces are the piston rings, and since the upper ring must necessarily be spaced slightly below the piston head, the extreme upper end of the cylinder may remain nearly round, the wear starting slightly below, forming a nearly semi-circular or crescent shaped ridge at the top of the cylinder.

With the cylinder in this condition, if the worn piston rings be replaced, the new upper ring, being a few thousandths of an inch wider than the worn one, strikes against this ridge, causing noisy operation of the motor. Frequently, moreover, the impact of the new ring against the ridge will be sufficiently severe so that the ring may be broken, causing the possibility of much greater damage to the cylinder. These difficulties may be obviously be avoided by machining out the ridge, leaving the entire cylinder of slightly oval cross section, but giving it a prolonged period of useful life before a complete reboring operation is necessary.

I prefer to utilize as a means for machining out the ridge the cylinder reconditioning tool described and claimed by me in my Patent No. 1,993,004, granted March 5, 1935, which has a flat base adapted to be positioned on top of a flat topped piston, and thereby utilizing the piston as a support during the machining process. Other ridge cutters normally supported on the top surface of the piston may be used, however.

Many modern automobiles utilize cylinders with pistons having curved top surfaces, and inasmuch as these curved surfaces have different radii of curvature it is quite obvious that the cylinder reconditioning tool would have to be made with a curved bottom surface to fit the various upper piston surfaces if the tool were to be supported directly by the piston. I have, however, invented a combination utilizing an adapter which allows the ridge cutting tool with a flat bottom surface to be utilized on pistons having curved upper surfaces, irrespective of the radius of curvature. This adapter allows the same tool to be utilized with any type of piston, irrespective of the curvature of the top surface, or whether the top surface is planar. Such adapters can be made cheaply and of diameters to accommodate different diameter cylinders. If cylinders have the same diameter but the pistons have a different radius of curvature, the same adapter will suffice.

A preferred combination of tool, adapter, piston and cylinder is illustrated in the drawing, wherein Fig. 1 is a view partly in section and partly in elevation of the combination of tool, adapter, piston and cylinder, the cylinder having a ridge thereon, and this ridge being exaggerated as to size in the drawing in order to make the illustration clear.

Fig. 2 is a top plan view of the adapter shown in Fig. 1.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

My invention may be more fully understood, and its scope determined, by a detailed description of the particular combination shown in the drawing.

I prefer to utilize the cylinder reconditioning tool 1 described and claimed in the above identified application. This reconditioning tool comprises a flat base plate 2, preferably having a bottom planar surface. The cylinder body 3 carries a bearing 4 rotating in the body 3 and locked in any position by thumb screw 5. A cutter axle, not shown, extends eccentrically through bearing 4, and terminates in a cutting wheel 6 at one end and a universal joint 7 at the other end, a power applying stub 8 extending from the universal joint for attachment to a rotating power source, such as an electric motor, for example, or the stub 8 may be chucked in an electric drill.

An engine cylinder 10 is shown as having a ridge 11 formed thereon by wear of the piston 12, carrying the usual upper piston ring 14. The piston, even when mounted in a new cylinder, is appreciably smaller than the diameter of the cylinder, the ring 14 providing the seal. The space 15 between the piston and the cylinder wall has been exaggerated for purposes of illustration. If the top surface of the piston is flat, then the foundation plate 2 may rest directly against the top of the piston, and by the rotation of the cutting wheel 6 the ridge may be cut out of the cylinder, as described in my prior patent.

It is obvious, however, that when the piston 12 is provided with a curved top surface 16 this procedure cannot be followed as there will be no firm foundation for the ridge cutter 1, and the cutting wheel 6 cannot be lined up so that it will cut parallel to the walls of the cylinder. I have therefore provided an adapter which is intermediate the piston and the ridge cutter so that the ridge cutter may be positioned in proper relation to the cylinder wall. This adapter is preferably formed in the shape of a cup having side walls 17, a flat top surface 18, and an out-flaring rim 19. The top surface is provided with a central aperture 20. This aperture is important because is prevents the top surface from buckling, and it also provides a convenient method for getting hold of the adapter for removal thereof.

The cup is preferably made of sufficient depth so that it will accommodate the curvature of all modern pistons of the particular diameter of cup used. The maximum depth, however, is not important. I have nevertheless found that it is preferable to form the outturned portion of the rim 19 to fit the curvature of the piston at the periphery of the top surface thereof, and I also prefer to make the adapter of a diameter very closely approximating the diameter of the original cylinder.

When the adapter is made of a diameter closely approaching that of the original cylinder it can be inserted through the top of the cylinder, as that portion of the cylinder does not become greatly worn, and after it is positioned on top of the piston it will still be slightly larger than the diameter of the piston, and in one diameter of the cylinder at least there is every likelihood that the adapter will practically touch the cylinder wall. The reason for this is that when ridges are worn in cylinders they are usually crescent shaped, the ridges are only worn in two opposed areas of the cylinder walls, and they are usually deeper on one side than on the other.

Thus it is possible to position the adapter securely within the cylinder so that it cannot tilt to any detrimental degree.

After the adapter has been inserted the ridge cutting tool 1 is positioned on the flat surface 18, the cutter depth adjusted, and the ridge cut out, whereupon the tool and the adapter may be removed and the cylinder will be ready for further use.

A great saving has been effected by combining the adapter with pistons having a curved top surface inasmuch as no change has to be made in the cutter, and the cutter will always be useful on flat top pistons. Thus, a single model of cutter can be used with the pistons having flat or curved tops, and only the adapters need to be supplied in varying diameters.

I claim:

1. In combination with a piston having a curved upper surface operating in an engine cylinder having an annular ridge thereon and a ridge cutting tool supported by said piston, a cup-shaped adapter having a rim adapted to seat on the periphery of the curved upper surface of said piston immediately adjacent the cylinder walls, and having a flat top surface adapted to support said ridge cutter.

2. The combination as set forth in claim 1 with only the rim of the adapter being shaped to fit an annular curved portion of the top surface of the piston adjacent the cylinder walls.

3. The combination as set forth in claim 1 wherein the adapter is shaped to be of greater diameter than the piston and to extend over the piston toward the cylinder walls for positioning thereby.

ELIOT D. GREEN.